Patented Sept. 5, 1950

2,520,939

UNITED STATES PATENT OFFICE 2,520,939

PROCESS OF CONCENTRATING MILK

Joseph F. Kowalewski, Anderson Township, Hamilton County, and George Sperti, Tusculum Heights, Ohio, assignors to Institutum Divi Thomae Foundation, Cincinnati, Ohio, a corporation of Ohio No Drawing. Application January 27, 1947, Serial No. 724,698

5 Claims. (Cl. 99—200)

This invention relates to the concentration of milk and especially of whole milk by freezing and centrifuging.

Various procedures have been proposed heretofore for concentrating milk by first freezing the milk and then centrifuging the frozen mass to separate the ice crystals from the remaining concentrate. As is well known, the ice crystals formed during freezing of the milk consist of substantially pure water, the dissolved and suspended matter being left in the remaining liquid which becomes more and more concentrated and collects in small pockets or voids throughout the mass of ice crystals. When the mass is then centrifuged, the ice is retained in the centrifuge basket, but the concentrate tends to be thrown out of the ice and at least part of it can thus be separated and recovered.

In practice, however, such procedures give low yields because too much of the milk solids is occluded or otherwise retained in the ice mass. Various expedients have been proposed to eliminate this difficulty. For example, it has been proposed in some cases to freeze the milk in cakes shaped to fit the centrifuge basket and to centrifuge without crushing or breaking up the ice mass. In such cases special freezing procedures have been suggested with the object of forming elongated crystals oriented in the direction in which the centrifugal force subsequently acts. In general, however, it has been proposed to crush the ice mass into relatively small pieces to facilitate the release and throwing out of the concentrate. In such cases it has been suggested that centrifuging be supplemented by washing the ice with dilute milk or even with water at the end of the centrifuging operation, and/or by allowing some thawing of the ice to take place, although these supplemental expedients tend to dilute the concentrate and thus to defeat the purpose of the operation.

In spite of all such measures, however, a substantial amount of the milk solids remain in the ice and are lost from the concentrate. This occurs to some extent in the case of proteins and other non-fat solids, but is especially noticeable in the case of fats and oils, hereinafter referred to simply as butter fat, which is present in substantial amounts and is one of the most valuable ingredients of whole milk. The butter fat particles tend to coalesce as water is removed in the form of ice and at the same time to congeal, and the congealed fat adheres to the ice so tenaciously that it is not thrown off during centrifuging and can not be separated from the ice without substantial thawing. As a result, it has also been proposed to separate the cream from whole milk before freezing and to add it back to the concentrate obtained by centrifuging. Aside from the undesirable multiplicity of operations involved in such procedures, however, it is difficult to reincorporate the cream properly in the concentrate.

The present invention provides a novel process whereby milk, and especially whole milk, can be frozen and centrifuged without undue retention of milk solids and particularly of butter fat in the ice. The yield of solids obtained in the concentrate is high and the distribution or balance between fats, proteins, etc., is substantially unchanged in comparison with the original milk. The concentrate is a homogeneous liquid which can be used as such or reconstituted to the original milk simply by mixing in the appropriate quantity of water.

The milk to be concentrated may first be pasteurized, but preferably pasteurization or sterilization operations are applied later to the concentrate as described hereinafter. The first step of processes embodying the present invention is to homogenize the milk. This step is particularly important with respect to the butter fat of whole milk for reasons set forth below, although similar advantages may be realized in connection with non-fat solids such as proteins. The effect of homogenization is, of course, to break down the particles of butter fat to smaller size and thus is apparently antagonistic to centrifugal separation of a concentrate of the butter fat from the water of the milk. During subsequent freezing, however, there is less coalescence of the small butter fat particles as the concentrate is formed progressively in the ice mass by the solidification of pure water into ice crystals, and the formation of relatively large congealed masses which stick to the ice is avoided. On the contrary, the small particles of butter fat in the homogenized milk appear to be held in suspension in a homogeneous concentrate which collects in the pockets or voids in the ice mass. Hence on centrifuging, the ice is retained mechanically in the basket but the concentrate is thrown out still retaining its homogeneous state and leaving only quite small amounts of the solids in the ice.

Homogenization may be carried out in any of the conventional types of homogenizing equipment, but for best results should be done thoroughly at pressures of 1000 lbs. or better since at lower pressures the amount of solids left in the ice increases unduly. Pressures up to 2000—

2500 lbs. may be used if desired, and in such cases homogenization may be performed in stages of increasing pressure.

The degree of concentration obtained by the process depends largely on the temperature of the ice mass during centrifuging, lower temperatures having the effect of retaining more water ice in the centrifuge and thus increasing the degree of concentration. Hence some variation of the final temperature of the ice mass may be desirable under different conditions. For general purposes, however, a final temperature of about −2° C. gives good results. This temperature may be reached by freezing the milk with a refrigerant maintained at −2° C., the centrifuge being operated to avoid any substantial increase of temperature of the ice mass. On the other hand, a colder refrigerant may be used after which the temperature of the frozen mass is allowed to rise to the desired point before centrifuging or in the centrifuge. The milk may be frozen in air or by means of brine or other suitable refrigerant. Good results have been obtained by freezing the milk in thin layers one inch or less in depth in a refrigerator held at −2° C., the time required to complete the freezing being about 12 hours.

Although in some cases the frozen mass may be placed directly in the centrifuge as noted above, it will usually be desirable to crush or break the mass into relatively small pieces in preparation for centrifuging. As an example, good yields are obtained with pieces or chunks of the frozen mass roughly ½ inch in size when centrifuged in a ten-inch diameter basket at about 2000 R. P. M. However, the size of the ice chunks and the size and speed of the centrifuge are not limited to these values which are stated for purposes of illustration only.

While the above process can be repeated if desired, the loss of solids in the ice increases each time the product is re-concentrated. On the other hand, such reconcentration is unnecessary for most purposes since it is possible in a single concentration under the above conditions to increase the percentage of solids two to three times with removal of over 50% of the water in the original milk and with a loss in the ice of solids amounting to only about 1% of the original milk. These results may be illustrated by a typical example. A whole milk was used containing 11.3% total solids, including 3.6% butter fat and 3.23% protein. After homogenization, freezing and centrifuging as described above, a concentrate was obtained containing 28.9% total solids, including 10.5% butter fat and 7% protein. Analysis of the ice remaining in the centrifuge showed a total amount of solids equal to only 1.27% of the residue ice (approximately 11% of the original milk solids) and including only 0.8% butter fat and 0.35% protein on the same basis. These results may be contrasted with those obtained when the same procedure is applied to non-homogenized milk in which case the amount of solids left in the ice is between 3% and 4% of the original milk or about 25–35% of the original milk solids.

The liquid concentrate can be frozen into blocks or cakes and stored in frozen form until needed, care being taken to prevent oxidation by appropriate wrapping or packaging. It can also be filled into cans or like containers which are then sealed and frozen and kept in frozen storage. When the frozen milk is to be used, it is simply thawed in any suitable manner, either in the package or container or after removal therefrom.

As noted above, pasteurization is preferably withheld until after the concentrate has been obtained by centrifuging. The raw milk is cooled immediately upon its receipt at the dairy in order to hold it until it can be processed. Pasteurization at this point requires heating the entire original volume and then cooling it down again for storage or in the freezing operation if it is processed immediately after pasteurization. After centrifuging, however, only the much smaller volume of the concentrate need be heated for pasteurization and then cooled and frozen for storage. Moreover, instead of pasteurizing and freezing the liquid concentrate, it can be sealed directly in containers and subjected therein to sterilization by heating to 212° F. or above or by irradiation with soft X rays, etc., after which the containers can be stored without freezing in the same manner as ordinary condensed or evaporated milk.

The liquid concentrate obtained from the centrifuge, or by thawing after frozen storage, etc., is a homogeneous liquid having roughly the consistency of coffee cream, but differing in that the proportion of butter fat is less and the proportion of non-fat solids is greater. In other words, the fat and non-fat solids in the concentrate are in substantially the same relative proportions as in the original milk, as indicated by the above example, but the concentrate has none of the cooked or boiled taste characteristic of ordinary evaporated milk nor have its physical and chemical properties been affected by heat treatment. These facts, as well as the consistency of the concentrate, make it a very desirable product for use on cereals and also in coffee or other beverages. When used in such beverages, there is no "feathering" out on top of the beverage such as is characteristic of frozen cream. Also the concentrate is an excellent material for the manufacture of ice-cream, producing a smooth creamy texture.

On the other hand, the concentrate can easily be reconstituted to milk practically indistinguishable from the original milk in every respect. It is only necessary to reincorporate the appropriate amount of water by ordinary stirring. Hence the concentrate forms a valuable supplement to the diet on board ship or in any region where fresh dairy supplies are not available. It also facilitates the distribution of fresh milk supplies and their delivery to the consumer, and aids in smoothing out peaks in the production of dairy products by facilitating their storage until times of relative scarcity.

It will be understood that the invention is not limited to the particular details set forth above by way of example, and also that various changes in the process can be made by those skilled in the art without departing from the spirit of the invention. Hence reference should be had to the appended claims for a definition of the limits of the invention.

What is claimed is:

1. A process for making a milk concentrate containing substantially all of the original non-aqueous constituents of whole milk with their qualities and flavor unimpaired by heat treatment which comprises homogenizing whole milk, freezing the homogenized milk into a mass of ice crystals with liquid concentrate in the voids between the crystals, the small particles of fat and non-fat solids remaining suspended in the liquid concentrate substantially without congealing on and sticking to the ice crystals, and substantially directly separating the liquid concentrate with its suspended fat and non-fat solids and dissolved materials from the ice crystals of the frozen mass, whereby a concentrate is produced without evaporation heat treatment and substantially without loss of non-aqueous constituents in the ice.

2. The process defined in claim 1, wherein the frozen mass is broken up into pieces and then subjected to centrifugal force.

3. The process defined in claim 1, wherein the concentrate is packed in containers and then sterilized in said containers.

4. A process for making and preserving a milk concentrate substantially without loss or deterioration of its original non-aqueous constituents which comprises homogenizing whole milk, freezing the homogenized milk into a mass of ice crystals with liquid concentrate in the voids between the crystals, the small particles of fat and non-fat solids remaining suspended in the liquid concentrate substantially without congealing on and sticking to the ice, substantially directly subjecting the frozen mass to centrifugal force while restraining the ice crystals against radial movement to separate therefrom the liquid concentrate with its suspended fat and non-fat solids and dissolved materials, and holding the concentrate in frozen storage, said concentrate on subsequent thawing containing substantially all of the original non-aqueous constituents of the whole milk with their qualities and flavor unimpaired by evaporation heat treatment and frozen storage.

5. The process defined in claim 4, wherein the concentrate is pasteurized before being placed in frozen storage.

JOSEPH F. KOWALEWSKI.
GEORGE SPERTI.

REFERENCES CITED

The following references are of record in the file of this patent:

UNITED STATES PATENTS

| Number | Name | Date |
|---|---|---|
| 523,677 | McIntyre | July 31, 1894 |
| 723,152 | Gurber | Mar. 17, 1903 |
| 994,555 | Alexander | June 6, 1911 |
| 1,738,275 | Baker | Dec. 3, 1929 |